(12) United States Patent
Yabuki et al.

(10) Patent No.: US 12,508,792 B2
(45) Date of Patent: Dec. 30, 2025

(54) DECORATING SHEET AND DISPLAY UNIT

(71) Applicant: Alps Alpine Co., Ltd., Tokyo (JP)

(72) Inventors: Masanori Yabuki, Miyagi-ken (JP); Emi Miyashita, Miyagi-ken (JP); Hiroshi Kobayashi, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 307 days.

(21) Appl. No.: 17/839,604

(22) Filed: Jun. 14, 2022

(65) Prior Publication Data
US 2022/0305756 A1 Sep. 29, 2022

Related U.S. Application Data

(63) Continuation of application No. PCT/JP2020/043047, filed on Nov. 18, 2020.

(30) Foreign Application Priority Data

Dec. 27, 2019 (JP) .................. 2019-238447

(51) Int. Cl.
*B32B 3/30* (2006.01)
*B32B 7/12* (2006.01)
(Continued)

(52) U.S. Cl.
CPC .................. *B32B 3/30* (2013.01); *B32B 7/12* (2013.01); *B32B 27/08* (2013.01); *B32B 27/40* (2013.01);
(Continued)

(58) Field of Classification Search
CPC ............. B32B 3/30; B32B 7/12; B32B 27/08; B32B 27/40; B32B 2255/10; B32B 2255/28;
(Continued)

(56) References Cited

U.S. PATENT DOCUMENTS

| | | | |
|---|---|---|---|
| 2014/0010996 A1* | 1/2014 | Yeh ........................... | B32B 7/06 428/209 |
| 2014/0170359 A1* | 6/2014 | Schwitte ................. | B32B 27/10 428/41.5 |
| 2015/0190955 A1* | 7/2015 | Yen .......................... | B32B 27/30 428/161 |

(Continued)

FOREIGN PATENT DOCUMENTS

| JP | 2014-069446 A | 4/2014 |
|---|---|---|
| JP | 2014-173203 A | 9/2014 |

(Continued)

OTHER PUBLICATIONS

English Translation for DE 202018003471 U1 (Year: 2019).*
International Search Report for corresponding International Application No. PCT/JP2020/043047 dated Feb. 2, 2021, with English translation (6 Pages).

*Primary Examiner* — Nathan L Van Sell
(74) *Attorney, Agent, or Firm* — Harness, Dickey & Pierce, P.L.C.

(57) ABSTRACT

A material-like decorating sheet that forms a material pattern on a surface of a decoration target component by being attached to the surface of the decoration target component includes a sheet-shaped transparent base film, and a colored layer disposed on a back surface of the base film and forming the material pattern with one or more inks. The base film has, on an outer surface, an uneven portion that provides a texture corresponding to the material pattern. The colored layer has an uncolored pattern including a plurality of uncolored areas that are portions not colored with the one or more inks.

16 Claims, 14 Drawing Sheets

(51) Int. Cl.
   *B32B 27/08* (2006.01)
   *B32B 27/40* (2006.01)
   *G02F 1/1335* (2006.01)
(52) U.S. Cl.
   CPC ....... *B32B 2255/10* (2013.01); *B32B 2255/28* (2013.01); *B32B 2274/00* (2013.01); *B32B 2307/4023* (2013.01); *B32B 2307/412* (2013.01); *B32B 2451/00* (2013.01); *B32B 2457/20* (2013.01); *B32B 2605/003* (2013.01); *G02F 1/133512* (2013.01); *G02F 1/133514* (2013.01)
(58) Field of Classification Search
   CPC ........ B32B 2274/00; B32B 2307/4023; B32B 2307/412; B32B 2451/00; B32B 2457/20; B32B 2605/003; B32B 2457/208; B32B 27/36; B32B 33/00; G02F 1/133512; G02F 1/133514; G02F 1/133374; G02F 1/133331; B41M 3/00; G09F 13/04
   See application file for complete search history.

(56) References Cited

U.S. PATENT DOCUMENTS

2020/0332461 A1  10/2020  Hayashi et al.
2020/0384678 A1* 12/2020  Niibe ...................... B32B 27/18
2021/0122138 A1*  4/2021  Shibano ................. B32B 27/06

FOREIGN PATENT DOCUMENTS

| | | | |
|---|---|---|---|
| JP | 2017-102016 | A | 6/2017 |
| JP | 2018-163341 | A | 10/2018 |
| JP | 2018-173561 | A | 11/2018 |
| JP | 2019-083107 | A | 5/2019 |
| WO | WO-2019189407 A1 * | 10/2019 | ........... B32B 15/082 |

* cited by examiner

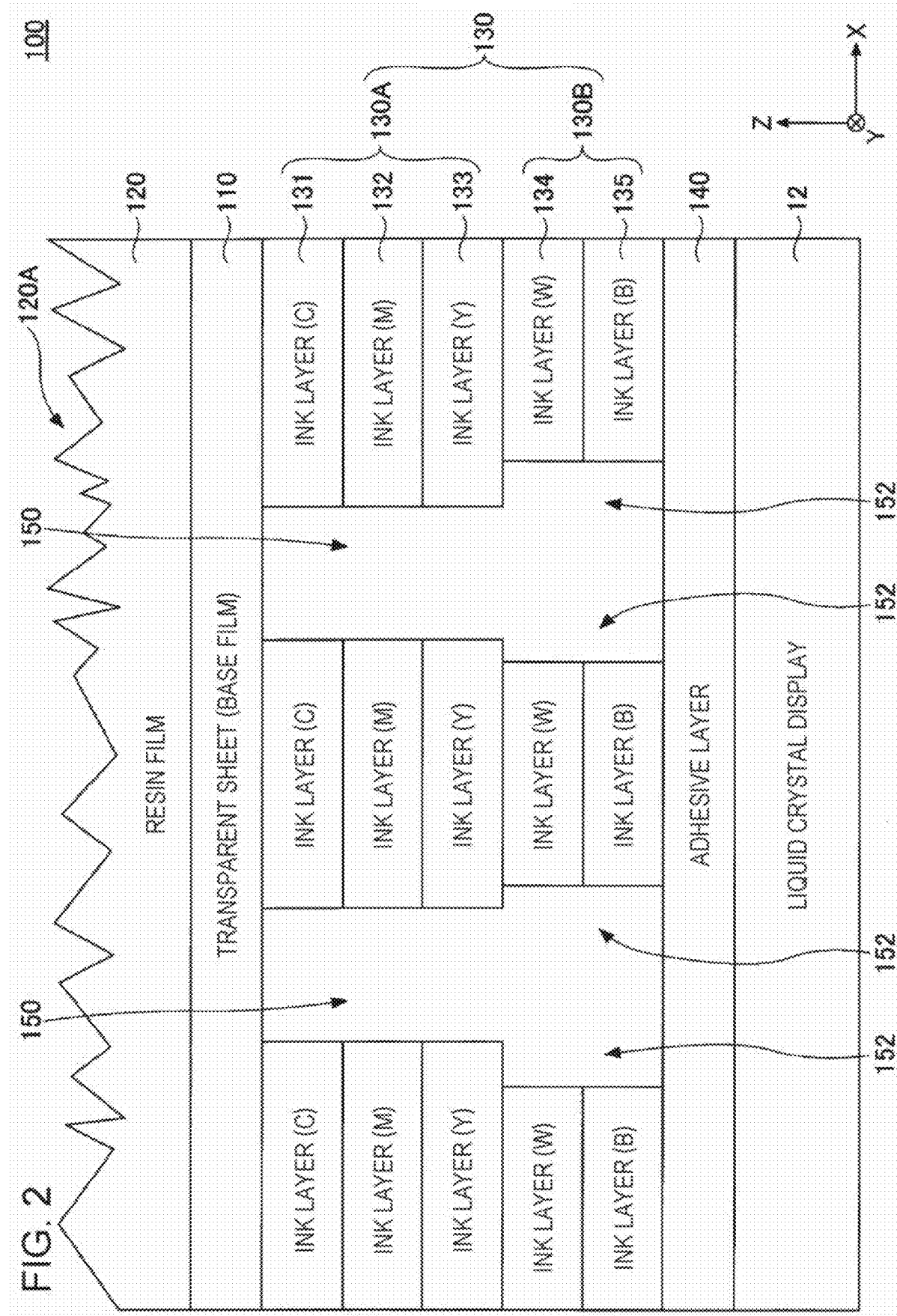

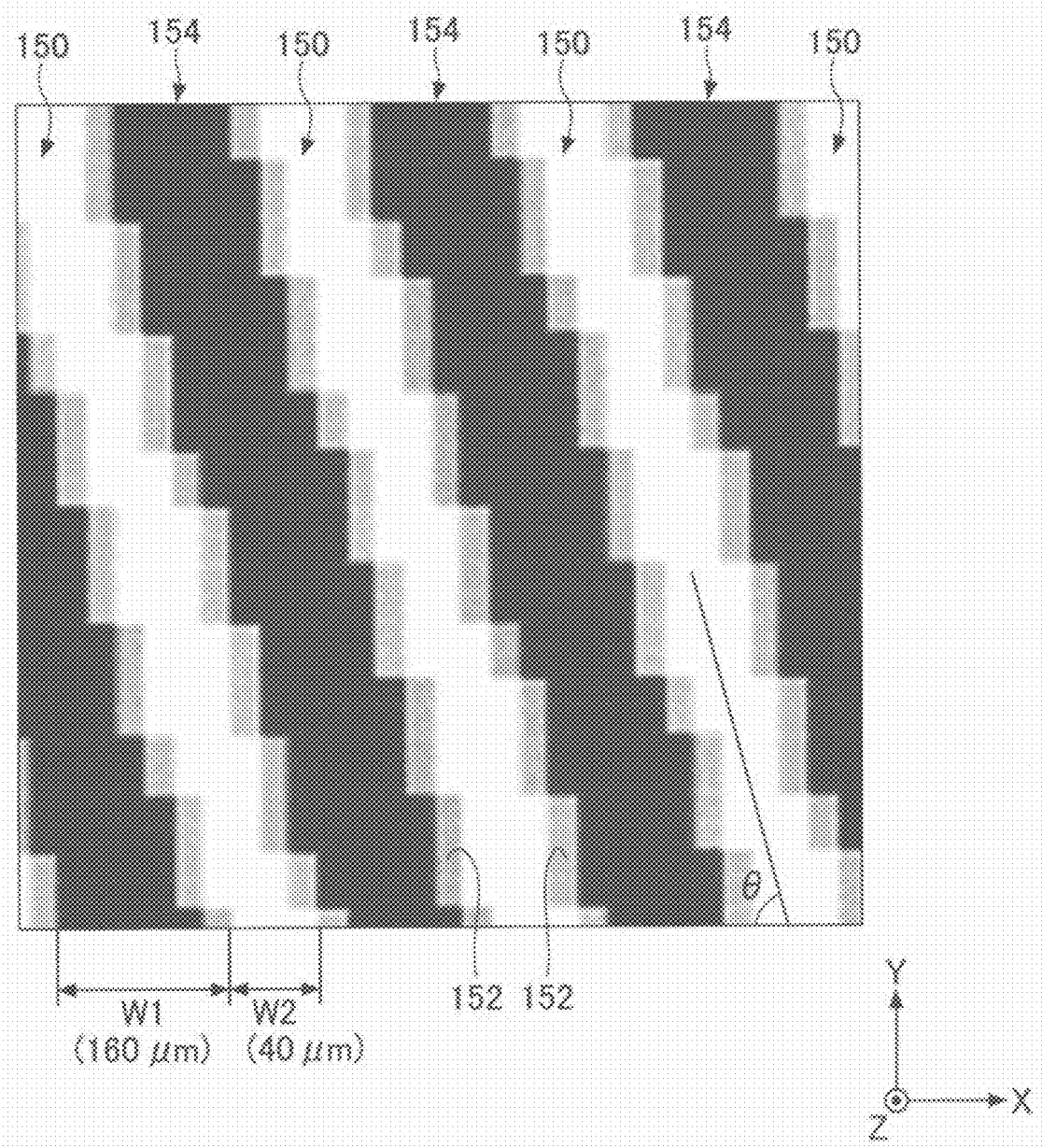

FIG. 6

| PATTERN | MOIRE REDUCTION EFFECT | REASON |
|---|---|---|
| GRID PATTERN | POOR | INTERFERENCE WITH LCD |
| ERROR DIFFUSION | POOR | RESOLUTION LOWERED |
| STRIPED PATTERN | GOOD | |

FIG. 7

| INCLINATION ANGLE | MOIRE REDUCTION EFFECT | REASON |
|---|---|---|
| 0° | POOR | INTERFERENCE WITH LCD |
| 45° | FAIR | |
| 60° | GOOD | |
| 90° | POOR | INTERFERENCE WITH LCD |

FIG. 8

| GROOVE WIDTH | LIGHT BLOCKING EFFECT | REASON |
|---|---|---|
| 20 μm | POOR | PRINT FAILURE |
| 40 μm | GOOD | |
| 60 μm | FAIR | |
| 80 μm | POOR | RESOLUTION LOWERED |
| 100 μm | POOR | RESOLUTION LOWERED |
| 120 μm | POOR | RESOLUTION LOWERED |

FIG. 9

| RATE OF AREA OCCUPIED BY COLORED AREAS | IMAGE QUALITY | REASON |
|---|---|---|
| 80% | GOOD | PRINT FAILURE |
| 75% | GOOD | |
| 60% | FAIR | FAINT IMAGE |
| 50% | FAIR | FAINT IMAGE |

FIG. 10

| WIDTH OF ENLARGED PORTION | LIGHT BLOCKING EFFECT/ COLOR OPACITY | REASON |
|---|---|---|
| 0 μm | FAIR | INCLUDING SOME COLOR OPACITY |
| 40 μm | GOOD | |
| 80 μm | POOR | LIGHT BLOCKING EFFECT LOWERED |

FIG. 11

|  | a<br>(GROOVE WIDTH) | b<br>(THICKNESS) | c<br>(VIEWING ANGLE) |
|---|---|---|---|
| COMPARATIVE EXAMPLE 1 | 40 | 120 | 36.9 |
| COMPARATIVE EXAMPLE 2 | 60 | 50 | 100.4 |
| EMBODIMENT | 40 | 6 | 162.9 |

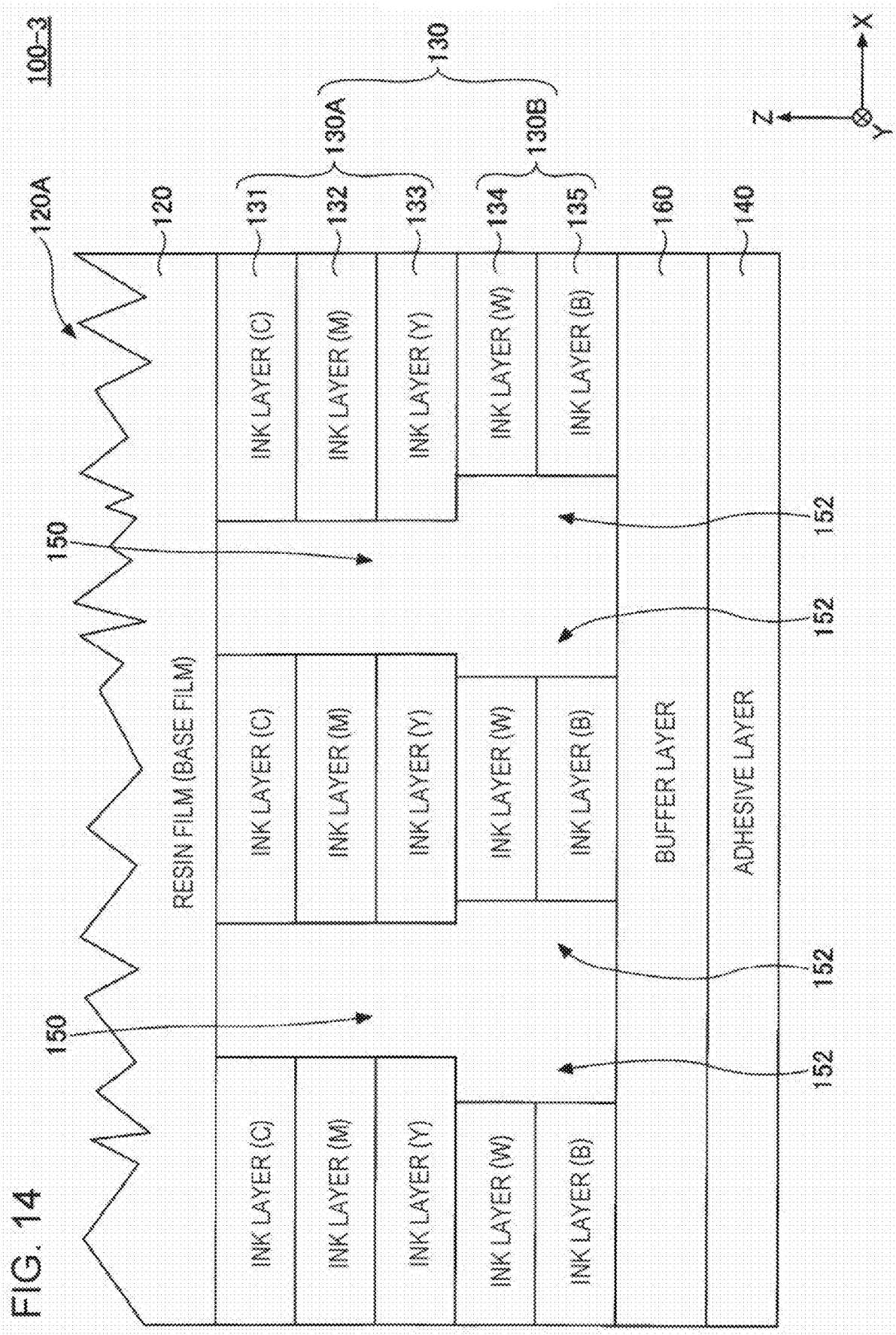

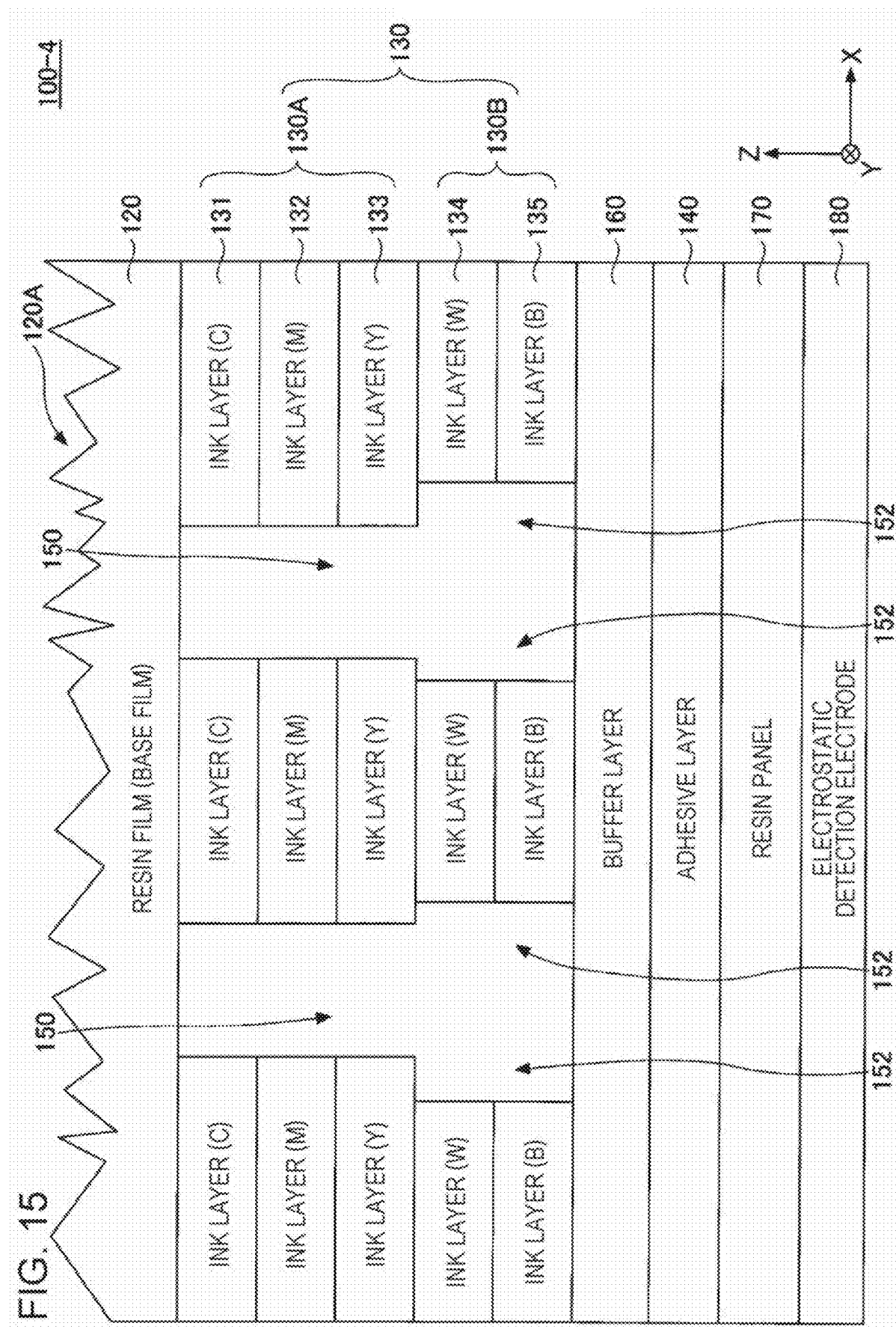

DECORATING SHEET AND DISPLAY UNIT

CLAIM OF PRIORITY

This application is a Continuation of International Application No. PCT/JP2020/043047 filed on Nov. 18, 2020, which claims benefit of Japanese Patent Application No. 2019-238447 filed on Dec. 27, 2019. The entire contents of each application noted above are hereby incorporated by reference.

BACKGROUND OF THE INVENTION

1. Field of the Invention

The present invention relates to a decorating sheet and a display unit.

2. Description of the Related Art

A technology of attaching a decorating sheet having a decoration pattern (such as a leather pattern, a metallic pattern, or a wood-grain pattern) to the surface of a decoration target component such as a component for a vehicle (for example, an inner panel) is used to decorate the surface of the decoration target component with the decoration pattern.

In addition, a technology to transmit, through a decorating sheet having a light transmittance, light emitted from a light source disposed at the back of the decorating sheet, and to visually identify the light from the surface of the decorating sheet has been developed (see, for example, Japanese Unexamined Patent Application Publication No. 2019-83107 and Japanese Unexamined Patent Application Publication No. 2014-173203).

When a display device (such as a liquid crystal display) is disposed on the back of an existing decorating sheet, the decorating sheet does not allow light to be preferably transmitted through a screen displayed on the display device. Thus, a viewer fails to clearly visually identify the screen displayed on the display device from the surface of the decorating sheet.

SUMMARY OF THE INVENTION

A decorating sheet according to one embodiment is a material-like decorating sheet that forms a material pattern on a surface of a decoration target component when attached to the surface. The decorating sheet includes a sheet-shaped transparent base film, and a colored layer disposed on a back surface of the base film, formed from one or more inks, and forming a material pattern. The base film includes, on an outer surface, an uneven portion that provides a texture corresponding the material pattern. The colored layer has an uncolored pattern including multiple uncolored areas that are portions not colored with ink.

According to one embodiment, a screen displayed on a display device disposed on a back surface of a decorating sheet can be clearly visually identified from a surface of the decorating sheet.

BRIEF DESCRIPTION OF THE DRAWINGS

FIG. 2 is a schematic view of a cross-sectional structure of a decorating sheet according to one embodiment;

FIG. 3 is a partially enlarged view of the surface of a colored layer of a decorating sheet according to one embodiment;

FIG. 6 is a table showing the results of a first example of a display unit according to one embodiment;

FIG. 7 is a table showing the results of a second example of a display unit according to one embodiment;

FIG. 8 is a table showing the results of a third example of a display unit according to one embodiment;

FIG. 9 is a table showing the results of a fourth example of a display unit according to one embodiment;

FIG. 10 is a table showing the results of a fifth example of a display unit according to one embodiment;

FIG. 11 is a table showing the results of a comparative example of a display unit according to one embodiment;

FIG. 14 is a diagram of a second comparative example of a decorating sheet according to one embodiment; and FIG. 15 is a diagram of a third comparative example of a decorating sheet according to one embodiment.

DESCRIPTION OF THE PREFERRED EMBODIMENTS

One embodiment will be described below with reference to the drawings.

Summary of Display Unit 10

Figure 1:
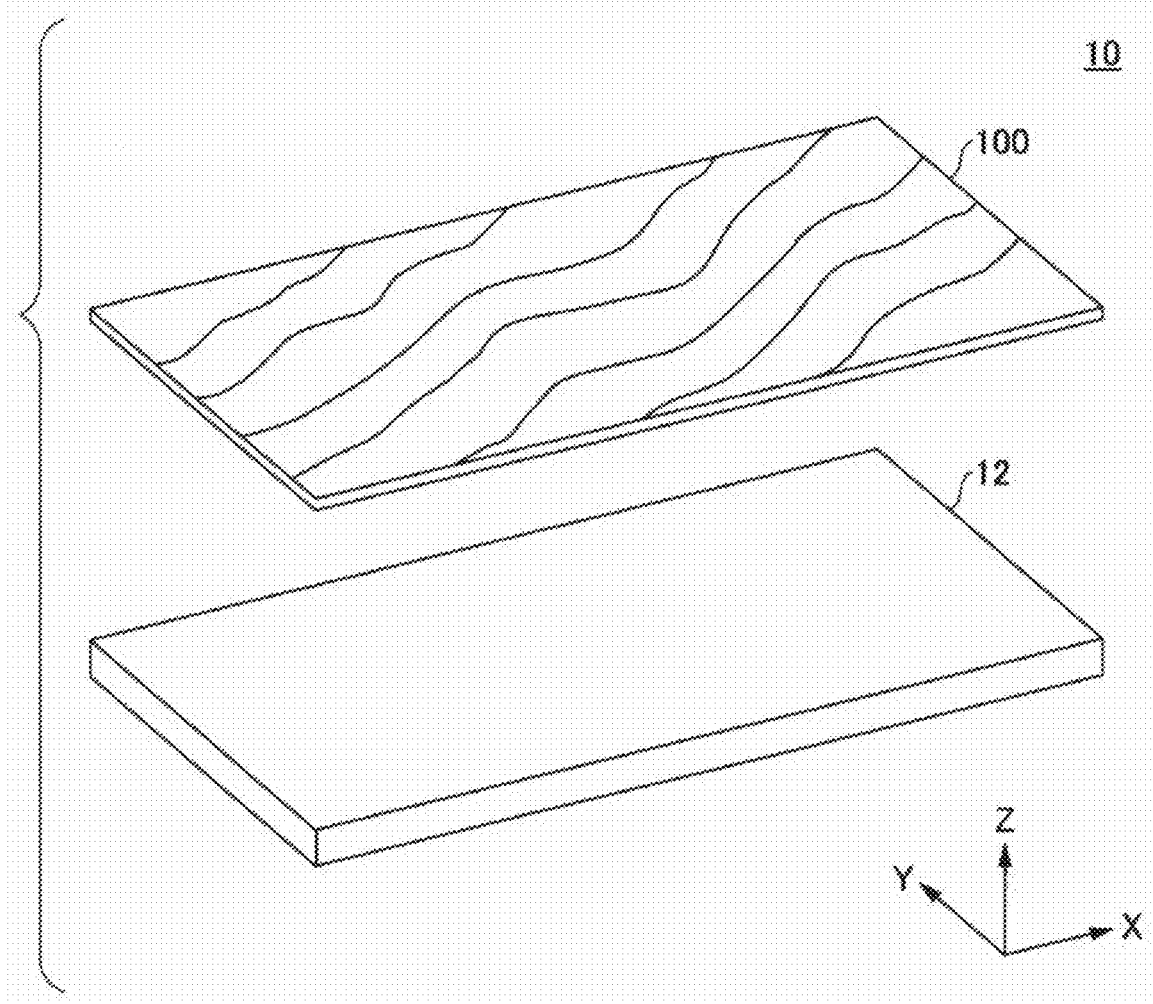
FIG. 1 is an exploded perspective view of a display unit according to one embodiment.

FIG. 1 is an exploded perspective view of a display unit 10 according to one embodiment. The display unit 10 illustrated in FIG. 1 is a device installed in, for example, a vehicle such as a car, to display various screens (including, for example, an operation screen, a map screen, and a camera screen) relating to the vehicle. As illustrated in FIG. 1, the display unit 10 includes a cloth-pattern-like decorating sheet 100 (an example of a "material-like" decorating sheet 100), and a liquid crystal display 12.

The liquid crystal display 12 displays various screens (including, for example, a map screen, an operation screen, an information display screen, and an application screen).

The decorating sheet 100 is a flexible sheet-shaped member having a cloth pattern (an example of "a material pattern", such as a denim-like pattern) on the surface. The decorating sheet 100 is attached to the surface of the liquid crystal display 12 (or a transparent plate disposed in front of the liquid crystal display 12) to decorate the surface of the liquid crystal display 12 (or a transparent plate) with the cloth pattern.

The decorating sheet 100 has a surface that has undergone uneven-surface finishing corresponding to the cloth pattern. Thus, the decorating sheet 100 can provide a texture corresponding to the cloth pattern to a contactor (such as an operator's finger) that comes into contact with the surface of the liquid crystal display 12 (or a transparent plate).

The decorating sheet 100 has light transmittance. Thus, when the liquid crystal display 12 displays an image, the decorating sheet 100 allows the image to be viewed therethrough and to be visually identified from the surface of the decorating sheet 100.

Structure of Decorating Sheet 100

FIG. 2 is a schematic view of a cross-sectional structure of the decorating sheet 100 according to one embodiment. As illustrated in FIG. 2, the decorating sheet 100 includes a resin film 120, a transparent sheet 110, a colored layer 130, and an adhesive layer 140 in order from the outer surface (from the top in the drawing).

The resin film 120 is disposed at the outmost surface portion of the decorating sheet 100. The resin film 120 is attached to the outer surface (a top surface in the drawing) of the transparent sheet 110. The resin film 120 has, on the surface, an uneven portion 120A corresponding to the cloth pattern provided by the colored layer 130. Thus, the resin film 120 provides a texture (more specifically, a texture just like a texture that a contactor (such as a human hand or finger) that comes into contact with the surface of the decorating sheet 100 feels when the contactor touches the surface of a real cloth material) corresponding to the cloth pattern provided by the colored layer 130 to the contactor. For example, the uneven portion 120A is formed through thermal transfer printing with a thermal transfer printer involving printing of multiple layers with transparent thermal transfer inks on the surface of the resin film 120. In the present embodiment, an elastomer resin is used as a preferable example of a resin material for the resin film 120. Instead of being formed through thermal transfer, the uneven portion 120A may be formed by, for example, screen printing.

The transparent sheet 110 is an example of "a base film", and serves as a base layer of the decorating sheet 100. The decorating sheet 100 is formed by laminating layers on the transparent sheet 110. For example, a flexible transparent sheet-shaped resin material (such as polymethyl methacrylate (PMMA), polyurethane, or polyethylene terephthalate (PET)) is used for the transparent sheet 110. The transparent sheet 110 overlaps the outer surface of the colored layer 130, and thus also serves as a protection layer that protects the surface of the colored layer 130.

The colored layer 130 is formed on the back surface (a lower surface in the drawing) of the transparent sheet 110. The colored layer 130 includes a decoration layer 130A and a light-shielding layer 130B.

The decoration layer 130A represents a cloth pattern (such as a denim-like pattern) provided by the decorating sheet 100. The decoration layer 130A is formed by laminating one or more ink layers in accordance with the cloth pattern. For example, in the example illustrated in FIG. 2, the decoration layer 130A includes a first ink layer 131, a second ink layer 132, and a third ink layer 133 in order from the top. The first ink layer 131 is formed with a cyan (C) ink. The second ink layer 132 is formed with a magenta (M) ink. The third ink layer 133 is formed with a yellow (Y) ink.

The light-shielding layer 130B is formed on the back surface of the decoration layer 130A. The light-shielding layer 130B blocks light emitted from the back surface of the decorating sheet 100. The light-shielding layer 130B is formed by laminating one or more ink layers. For example, in the example illustrated in FIG. 2, the light-shielding layer 130B includes a fourth ink layer 134 and a fifth ink layer 135 in order from the top. The fourth ink layer 134 is formed with a white (W) ink. The fifth ink layer 135 is formed with a black (B) ink. The light-shielding layer 130B is provided to almost completely block visual identification of the liquid crystal display 12, disposed on the back surface of the decorating sheet 100, from the surface of the decorating sheet 100 mainly when the liquid crystal display 12 does not display a screen 12A.

In the present embodiment, each of the multiple ink layers 131 to 135 in the colored layer 130 is directly formed on the back surface of the transparent sheet 110 with thermal transfer inks through thermal transfer printing with a thermal transfer printer. Thus, the colored layer 130 in the decorating sheet 100 can have an extremely small thickness of approximately "6 µm".

The adhesive layer 140 is formed at the backmost surface portion of the decorating sheet 100 (lower side in the drawing) to allow the decorating sheet 100 to be attached to the surface of a decoration target component (for example, the liquid crystal display 12 or a transparent plate disposed in front of the liquid crystal display 12). In the present embodiment, the adhesive layer 140 is formed on the back surface of the colored layer 130. For example, the adhesive layer 140 is formed with an adhesive such as an optical clear adhesive (OCA). The adhesive layer 140 may be absent at factory shipment of the decorating sheet 100. In this case, the adhesive layer 140 may be, for example, formed when the decorating sheet 100 is to be attached to the surface of a decoration target component.

FIG. 3 is a partially enlarged diagram of the surface of the colored layer 130 in the decorating sheet 100 according to one embodiment. FIG. 3 illustrates part of the surface of the colored layer 130 in an enlarged manner in units of pixels.

As illustrated in FIG. 3, the colored layer 130 includes multiple groove-shaped uncolored areas 150, which extend obliquely and parallel to each other with respect to one side of the decorating sheet 100 when a Y-axis direction is defined as a vertical direction and an X-axis direction is defined as a lateral direction. The uncolored areas 150 are areas not colored with inks. Thus, the colored layer 130 has an obliquely striped uncolored pattern formed with the multiple uncolored areas 150. Portions in the colored layer 130 other than the uncolored areas 150 are referred to as colored areas 154.

At edges of each of the uncolored areas 150, enlarged areas 152 are disposed. The enlarged areas 152 are areas where the groove width of the uncolored areas 150 in the light-shielding layer 130B is enlarged from the groove width of the uncolored areas 150 in the decoration layer 130A. Specifically, the enlarged areas 152 are areas where the decoration layer 130A is formed but the light-shielding layer 130B is not formed. In the present embodiment, as illustrated in FIG. 3, the width of each of the left and right enlarged areas 152 is one pixel.

In the present embodiment, each colored area 154 has a groove width W1 of 160 µm, and each uncolored area 150 has a groove width W2 of 40 µm. Thus, in the colored layer 130, the rate of the area occupied by the colored areas 154 is 80%. In the present embodiment, an inclination angle θ of the groove-shaped uncolored areas 150 with respect to the lateral direction (X axis) of the display screen of the liquid crystal display 12 is 60°.

Display Example of Display Unit 10

Figure 4A:
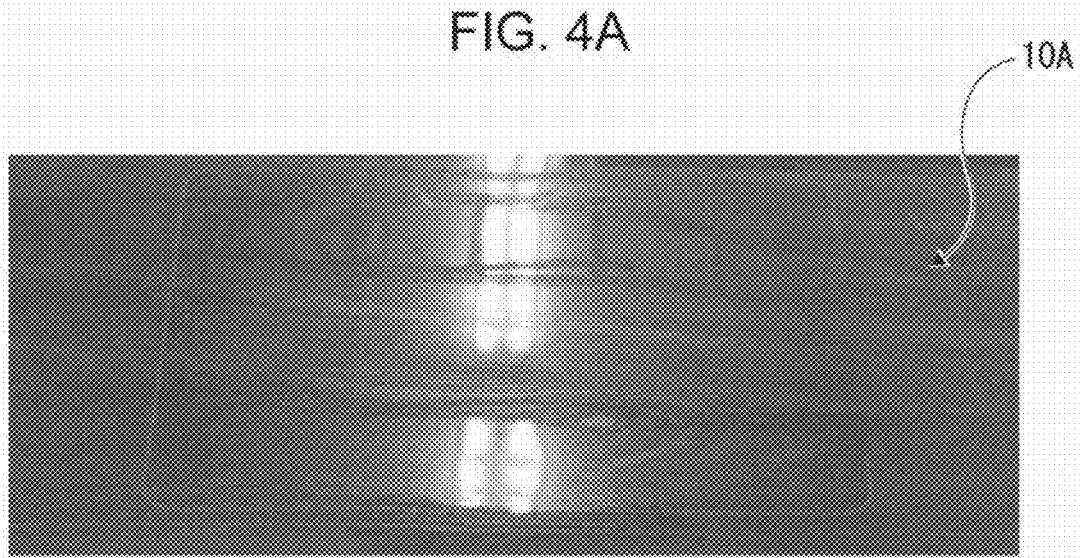
FIGS. 4A and 4B are diagrams of a display of a display unit according to one embodiment.
Figure 4B:
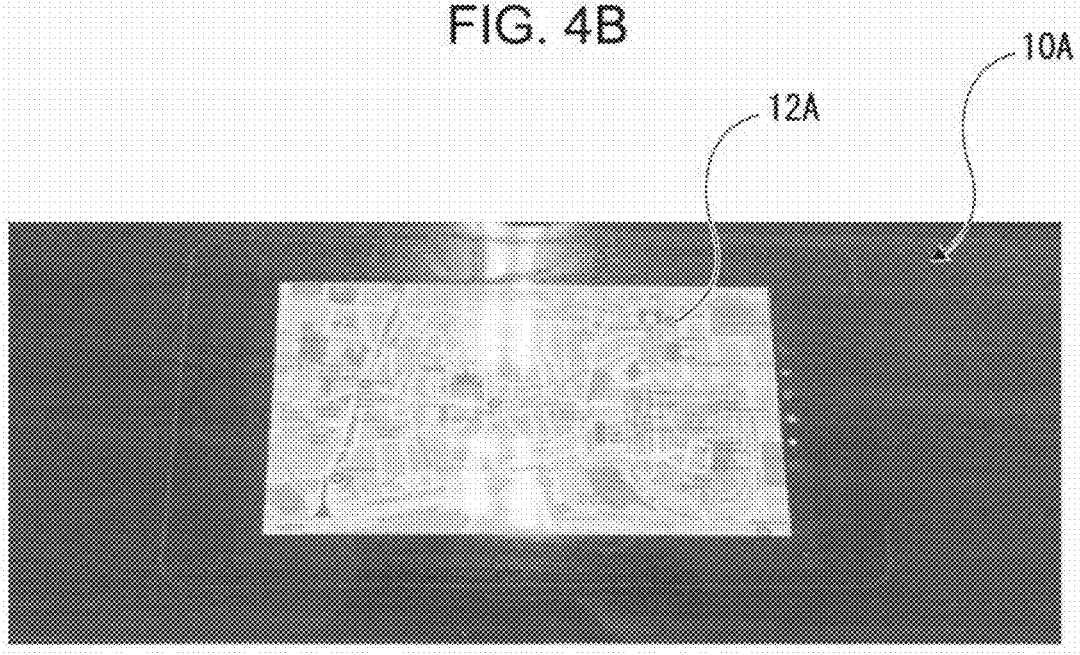
Figure 5A:
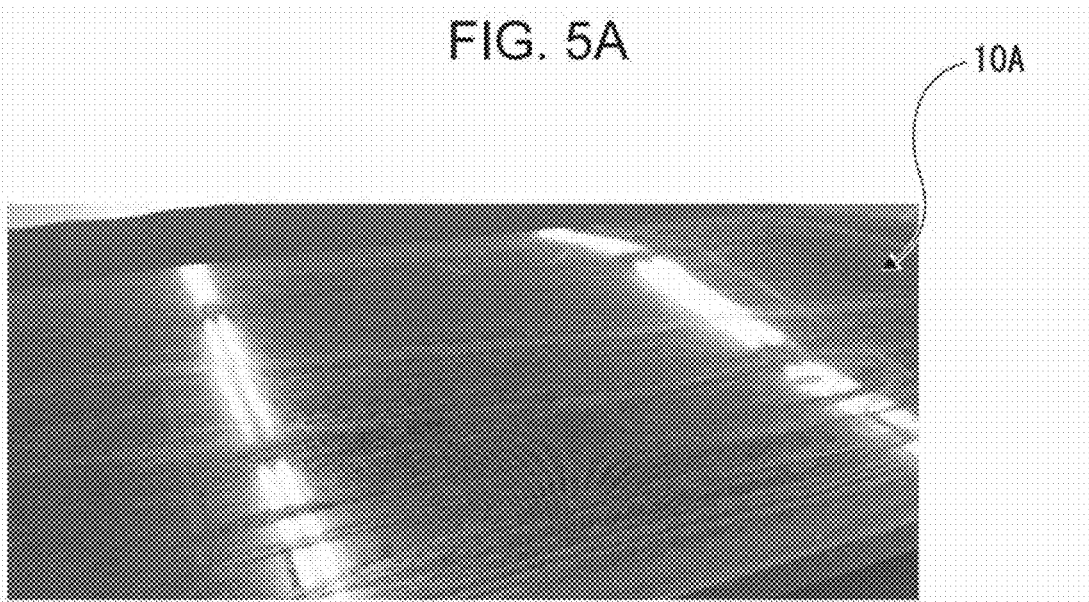
FIGS. 5A and 5B are diagrams of a display of a display unit according to one embodiment.
Figure 5B:
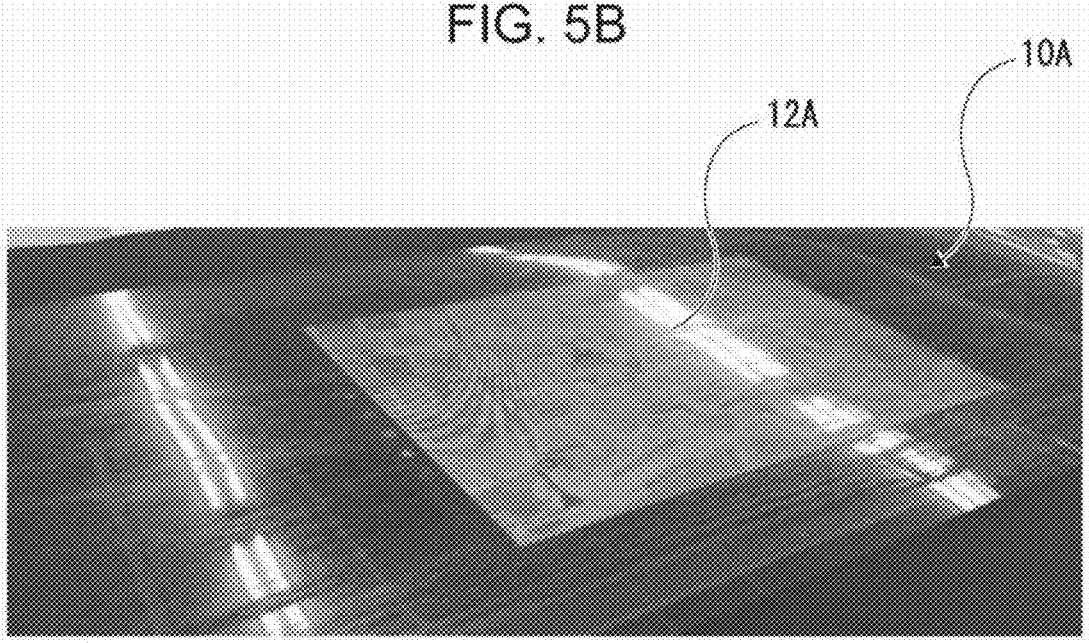

FIGS. 4A and 4B and FIGS. 5A and 5B illustrate display examples of the display unit 10 according to one embodiment. FIGS. 4A and 4B illustrate a surface 10A of the display unit 10 when viewed from the front. FIGS. 5A and 5B illustrate the surface 10A of the display unit 10 when viewed from the obliquely front.

As illustrated in FIG. 4A, in a front view of the surface 10A of the display unit 10 according to one embodiment, when the liquid crystal display 12 does not display the screen 12A, the cloth pattern of the decorating sheet 100 can be clearly visually identified while the rate of the area occupied by the colored areas 154 in the colored layer 130 of the decorating sheet 100 is set to 80%. In this case, the light-shielding layer 130B included in the decorating sheet 100 can almost completely block visual identification of the liquid crystal display 12 disposed on the back surface of the decorating sheet 100.

As illustrated in FIG. 4B, in a front view of the surface 10A of the display unit 10 according to one embodiment, when the liquid crystal display 12 displays the screen 12A, the decorating sheet 100 allows the screen 12A to be viewed therethrough, and thus a viewer can clearly visually identify the screen 12A. Also in this case, the colored layer 130 in the decorating sheet 100 has an obliquely striped uncolored pattern. Thus, the screen 12A visually identified from the surface 10A of the display unit 10 can reduce occurrence of moire. In this case, visual identification of the cloth pattern of the decorating sheet 100 can be blocked in an area that overlaps the screen 12A.

As shown in FIG. 5A, in an obliquely front view of the surface 10A of the display unit 10 according to one embodiment, when the liquid crystal display 12 does not display the screen 12A, the cloth pattern of the decorating sheet 100 can be clearly visually identified. Also in this case, the light-shielding layer 130B included in the decorating sheet 100 can almost completely block visual identification of the liquid crystal display 12 disposed on the back surface of the decorating sheet 100.

As illustrated in FIG. 5B, also in an obliquely front view of the surface 10A of the display unit 10 according to one embodiment, when the liquid crystal display 12 displays the screen 12A, the screen 12A that is viewed through the decorating sheet 100 has a relatively large viewing angle. Thus, a viewer can clearly visually identify the screen 12A. Also in this case, the screen 12A visually identified from the surface 10A of the display unit 10 can also reduce occurrence of moire. Also in this case, visual identification of the cloth pattern of the decorating sheet 100 can be almost completely blocked in an area that overlaps the screen 12A.

As described above, the display unit 10 according to one embodiment has an uncolored pattern including the multiple groove-shaped uncolored areas 150 in the colored layer 130 in the decorating sheet 100. Thus, in the display unit 10 according to one embodiment, the uncolored patterns allow a screen displayed on the liquid crystal display 12 to be viewed therethrough, and to be clearly visually identified from the surface of the decorating sheet 100.

Particularly, the display unit 10 according to one embodiment includes the obliquely striped uncolored patterns including the groove-shaped uncolored areas 150 extending obliquely in the colored layer 130 in the decorating sheet 100. Thus, the display unit 10 according to one embodiment can reduce interference between the uncolored pattern and the screen displayed on the liquid crystal display 12. Thus, the display unit 10 according to one embodiment can reduce occurrence of moire in the screen displayed on the liquid crystal display 12 when the screen is visually identified from the surface of the decorating sheet 100.

In the display unit 10 according to one embodiment, the uncolored areas 150 in the colored layer 130 in the decorating sheet 100 have an inclination angle of 60°. Thus, the display unit 10 according to one embodiment can further reduce interference between the uncolored pattern and the screen displayed on the liquid crystal display 12. This structure can thus reduce occurrence of moire in the screen when the screen is visually identified from the surface of the decorating sheet 100.

The display unit 10 according to one embodiment has the uncolored areas 150 in the colored layer 130 with a relatively small thickness. Thus, the viewing angle of the screen viewable through the decorating sheet 100 can be relatively increased. Thus, the display unit 10 according to one embodiment allows the screen to be clearly visually identified therethrough regardless of when the screen viewable through the decorating sheet 100 is obliquely viewed.

In the display unit 10 according to one embodiment, the uncolored areas 150 in the light-shielding layer 130B have a larger groove width than the uncolored areas 150 in the decoration layer 130A. Thus, regardless of when the light-shielding layer 130B in the display unit 10 according to one embodiment is misaligned when being printed, the edges of the light-shielding layer 130B are prevented from overlapping the uncolored areas 150. Thus, the display unit 10 according to one embodiment can prevent reduction of the quantity of light that passes through the uncolored areas 150.

In the display unit 10 according to one embodiment, the colored areas 154 have the groove width W1 of 160 μm, and the uncolored areas 150 have the groove width W2 of 40 μm. Thus, the rate of the area occupied by the colored areas 154 in the colored layer 130 is 80% (within a preferable area rate). Thus, the display unit 10 according to one embodiment can fully secure the area in the decorating sheet 100 where the cloth pattern is printed while the decorating sheet 100 fully retains the transmittance to allow the screen to be viewed therethrough. Thus, the display unit 10 according to one embodiment allows the cloth pattern provided by the decorating sheet 100 to be visually identified more accurately with higher density from the surface of the decorating sheet 100.

First Example

Subsequently, with reference to FIG. 6, a first example of the display unit 10 according to one embodiment will be described. FIG. 6 is a table showing the results of a first example of the display unit 10 according to one embodiment. In the first example, how the effects of reducing moire change with a change of the uncolored pattern of the colored layer 130 in the decorating sheet 100 is observed.

As illustrated in FIG. 6, "a grid pattern", "error diffusion", and "a striped pattern" are used as examples of the uncolored pattern in the first example.

As illustrated in FIG. 6, the first example has revealed that, when the uncolored pattern is "a grid pattern", the uncolored pattern interferes with the screen displayed on the liquid crystal display 12, and moire occurs on the screen visually identified from the surface of the decorating sheet 100.

As illustrated in FIG. 6, the first example has revealed that, when the uncolored pattern is "error diffusion", the resolution is lowered in the screen visually identified from the surface of the decorating sheet 100.

As illustrated in FIG. 6, on the other hand, the first example has revealed that, when the uncolored pattern is "a striped pattern", the screen visually identified from the surface of the decorating sheet 100 can be clearly visually identified from the surface of the decorating sheet 100 without occurrence of moire or lowering of the resolution.

Thus, the first example has revealed that the display unit 10 according to one embodiment where the uncolored pattern of the colored layer 130 in the decorating sheet 100 is "a striped pattern" allows the screen displayed on the liquid crystal display 12 to be clearly visually identified from the surface of the decorating sheet 100.

Second Example

Now, with reference to FIG. 7, a second example of the display unit 10 according to one embodiment will be described. FIG. 7 is a table showing the results of a second example of the display unit 10 according to one embodiment. In the second example, how the effects of reducing moire change with a change of the inclination angle of the uncolored areas 150 in the decorating sheet 100 is observed.

As illustrated in FIG. 7, in the second example, "0°", "45°", "60°", and "90°" are used as examples of the inclination angle of the uncolored areas 150.

As illustrated in FIG. 7, the second example has revealed that, when the uncolored areas 150 have an inclination angle of "0°" or "90°", the uncolored pattern interferes with the pixel array (length and width) of the screen displayed on the liquid crystal display 12, and moire occurs on the screen visually identified from the surface of the decorating sheet 100.

On the other hand, as illustrated in FIG. 7, the second example has revealed that, when the uncolored areas 150 have an inclination angle of "45°" with respect to the pixel array (length and width) of the screen displayed on the liquid crystal display 12, the screen displayed on the liquid crystal display 12 can be clearly visually identified from the surface of the decorating sheet 100. Particularly, the second example has revealed that, when the uncolored areas 150 have an inclination angle of "60°", the screen displayed on the liquid crystal display 12 can be extremely clearly visually identified from the surface of the decorating sheet 100.

From the above, the second example has revealed that, in the display unit 10 according to one embodiment, when the uncolored areas 150 in the decorating sheet 100 have an inclination angle of "45°" to "60°", the screen displayed on the liquid crystal display 12 can be clearly visually identified from the surface of the decorating sheet 100.

Third Example

Now, with reference to FIG. 8, a third example of the display unit 10 according to one embodiment will be described. FIG. 8 is a table showing the results of a third example of the display unit 10 according to one embodiment. In the third example, how the light blocking effect of the decorating sheet 100 changes with a change of the groove width W2 of the uncolored areas 150 in the decorating sheet 100 is observed.

As illustrated in FIG. 8, in the third example, "20 μm", "40 μm", "60 μm", "80 μm", "100 μm", and "120 μm" are used as examples of the groove width W2 of the uncolored areas 150.

As illustrated in FIG. 8, the third example has revealed that, when the groove width W2 of the uncolored areas 150 is "20 μm", the uncolored areas 150 are extremely thin, and thus the thermal transfer printer fails to smoothly form the uncolored areas 150.

As illustrated in FIG. 8, the third example has revealed that, when the uncolored areas 150 have the groove width W2 of "80 μm", "100 μm", or "120 μm", the resolution is lowered in the screen visually identified from the surface of the decorating sheet 100.

As illustrated in FIG. 8, the third example has revealed that, when the uncolored areas 150 have the groove width W2 of "40 μm" or "60 μm", the screen displayed on the liquid crystal display 12 can be clearly visually identified from the surface of the decorating sheet 100. Particularly, the third example has revealed that, when the uncolored areas 150 have the groove width W2 of "40 μm", the screen displayed on the liquid crystal display 12 can be extremely clearly visually identified from the surface of the decorating sheet 100.

Thus, the third example has revealed that, in the display unit 10 according to one embodiment, the screen displayed on the liquid crystal display 12 can be clearly visually identified from the surface of the decorating sheet 100 when the uncolored areas 150 in the decorating sheet 100 have the groove width W2 of "40 μm" to "60 μm".

Fourth Example

With reference to FIG. 9, a fourth example of the display unit 10 according to one embodiment will be described now. FIG. 9 is a table showing the results of a fourth example of the display unit 10 according to one embodiment. In the fourth example, how the quality of the screen visually identified from the surface of the decorating sheet 100 changes with a change of the rate of the area occupied by the colored areas 154 in the colored layer 130 in the decorating sheet 100 is observed.

As illustrated in FIG. 9, in the fourth example, "80%", "75%", "60%", and "50%" are used as the rates of the area occupied by the colored areas 154.

As illustrated in FIG. 9, the fourth example has revealed that, when the rate of the area occupied by the colored areas 154 is "80%", the screen displayed on the liquid crystal display 12 can be clearly visually identified from the surface of the decorating sheet 100. However, when the rate of the area occupied by the colored areas 154 is "80%", the uncolored areas 150 are extremely thin, and a thermal transfer printer to be used may fail to smoothly form the uncolored areas 150 depending on the printing accuracy.

On the other hand, as illustrated in FIG. 9, the fourth example has revealed that, when the rate of the area occupied by the colored areas 154 is either "75%", "60%", or "50%", the screen displayed on the liquid crystal display 12 can be clearly visually identified from the surface of the decorating sheet 100. Particularly, the fourth example has revealed that, when the rate of the area occupied by the colored areas 154 is "75%", the screen can be extremely clearly visually identified from the surface of the decorating sheet 100 without lowering the density of the screen.

Thus, the fourth example has revealed that in the display unit 10 according to one embodiment, the screen displayed on the liquid crystal display 12 can be clearly visually identified from the surface of the decorating sheet 100 when the rate of the area occupied by the colored areas 154 in the decorating sheet 100 is with the range of "50%" to "80%".

Fifth Example

Now, with reference to FIG. 10, a fifth example of the display unit 10 according to one embodiment will be described. FIG. 10 is a table showing the results of a fifth example of the display unit 10 according to one embodiment. In the fifth example, how the light blocking effect of the decorating sheet 100 changes and how the color opacity of the screen visually identified from the surface of the decorating sheet 100 changes with a change of the width of each of the left and right enlarged areas 152 in the light-shielding layer 130B of the decorating sheet 100 is observed.

As illustrated in FIG. 10, in the fifth example, "0 µm", "40 µm", and "80 µm" are used as the width of the enlarged areas 152.

As illustrated in FIG. 10, the fifth example has revealed that, when the width of the enlarged areas 152 is "80 µm", the light blocking effect of the decorating sheet 100 is lowered.

In contrast, as illustrated in FIG. 10, the fifth example has revealed that, when the width of the enlarged areas 152 is "0 µm" or "40 µm", the screen displayed on the liquid crystal display 12 can be clearly visually identified from the surface of the decorating sheet 100 without lowering of the light blocking effect of the decorating sheet 100. Particularly, the fifth example has revealed that, when the width of the enlarged areas 152 is "40 µm", the screen visually identified from the surface of the decorating sheet 100 can be extremely clearly visually identified from the surface of the decorating sheet 100 without causing color opacity on the screen.

Thus, the fifth example has revealed that, in the display unit 10 according to one embodiment, the screen displayed on the liquid crystal display 12 can be clearly visually identified from the surface of the decorating sheet 100 while each of the left and right enlarged areas 152 in the light-shielding layer 130B of the decorating sheet 100 has a width within a range of "0 µm" to "40 µm".

Comparative Example

Figure 12:
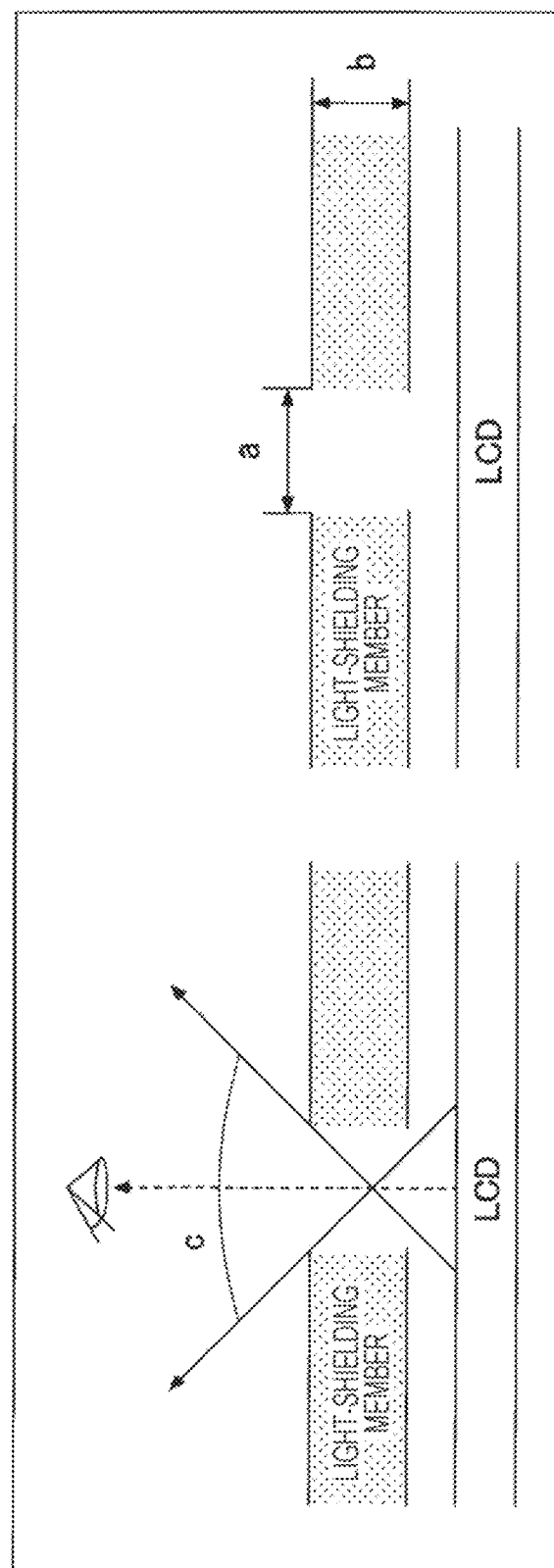
FIG. 12 is a schematic view of a dimension defining portion and a viewing angle of a decorating sheet in a comparative example of a display unit according to one embodiment.

Subsequently, with reference to FIGS. 11 and 12, comparative examples of the display unit 10 according to one embodiment will be described. FIG. 11 is a table showing the results of comparative examples of the display unit 10 according to one embodiment. FIG. 12 is a schematic view of a dimension defining portion and a viewing angle of a decorating sheet in a comparative example of the display unit 10 according to one embodiment.

In the present comparative example, decorating sheets for comparison each having an opening with a width a and a depth b for allowing the screen to be viewed therethrough different from the width and the depth of an opening in the decorating sheet 100 according to one embodiment are used as "a comparative example 1" and "a comparative example 2", which are based on an existing technology. In the comparative examples, a viewing angle c of the screen (screen displayed on the back of the decorating sheet) visually identifiable from the surface of the decorating sheet is obtained for each of the decorating sheet 100 according to one embodiment, "the comparative example 1", and "the comparative example 2".

In the decorating sheet 100 according to one embodiment, a light-shielding member (specifically, the colored layer 130) has an opening width a (specifically, a groove width of the uncolored areas 150) of "40 µm", and an opening depth b (specifically, a thickness of the colored layer 130) of "6 µm". The decorating sheet 100 according to one embodiment has this setting because an opening (specifically, the uncolored areas 150) is formed in an extremely thin thermal transfer ink serving as the light-shielding member.

On the other hand, "the comparative example 1" has an opening width a of "40 µm", and an opening depth b (specifically, a thickness of the colored layer 130) of "120 µm". "The comparative example 1" has this setting because an opening is formed in a base film serving as the light-shielding member in accordance with an existing technology.

"The comparative example 2" has an opening width a of "60 µm", and an opening depth b (specifically, a thickness of the colored layer 130) of "50 µm". "The comparative example 2" has this setting because an opening is formed in a metal plate serving as the light-shielding member in accordance with an existing technology.

As illustrated in FIG. 11, in the decorating sheet according to "the comparative example 1", the screen visually identifiable from the surface of the decorating sheet has the viewing angle c of "36.9°".

In the decorating sheet according to "the comparative example 2", the screen visually identifiable from the surface of the decorating sheet has the viewing angle c of "100.4°".

As illustrated in FIG. 11, in the decorating sheet 100 according to one embodiment, the screen visually identifiable from the surface of the decorating sheet 100 has the viewing angle c of "162.9°".

As described above, these comparative examples have revealed that the display unit 10 according to one embodiment can obtain an extremely large viewing angle c in the extremely thin thermal transfer ink with the presence of the openings (specifically, the uncolored areas 150). Thus, these comparative examples have revealed that, regardless of when the surface 10A of the display unit 10 according to one embodiment is viewed from the obliquely front, the screen 12A displayed on the liquid crystal display 12 can be clearly visually identified. In addition, these comparative examples have revealed that in the display unit 10 according to one embodiment, the openings (specifically, the uncolored areas 150) can be highly accurately formed in the colored layer 130 in units of pixels.

First Comparative Example of Decorating Sheet 100

Figure 13:
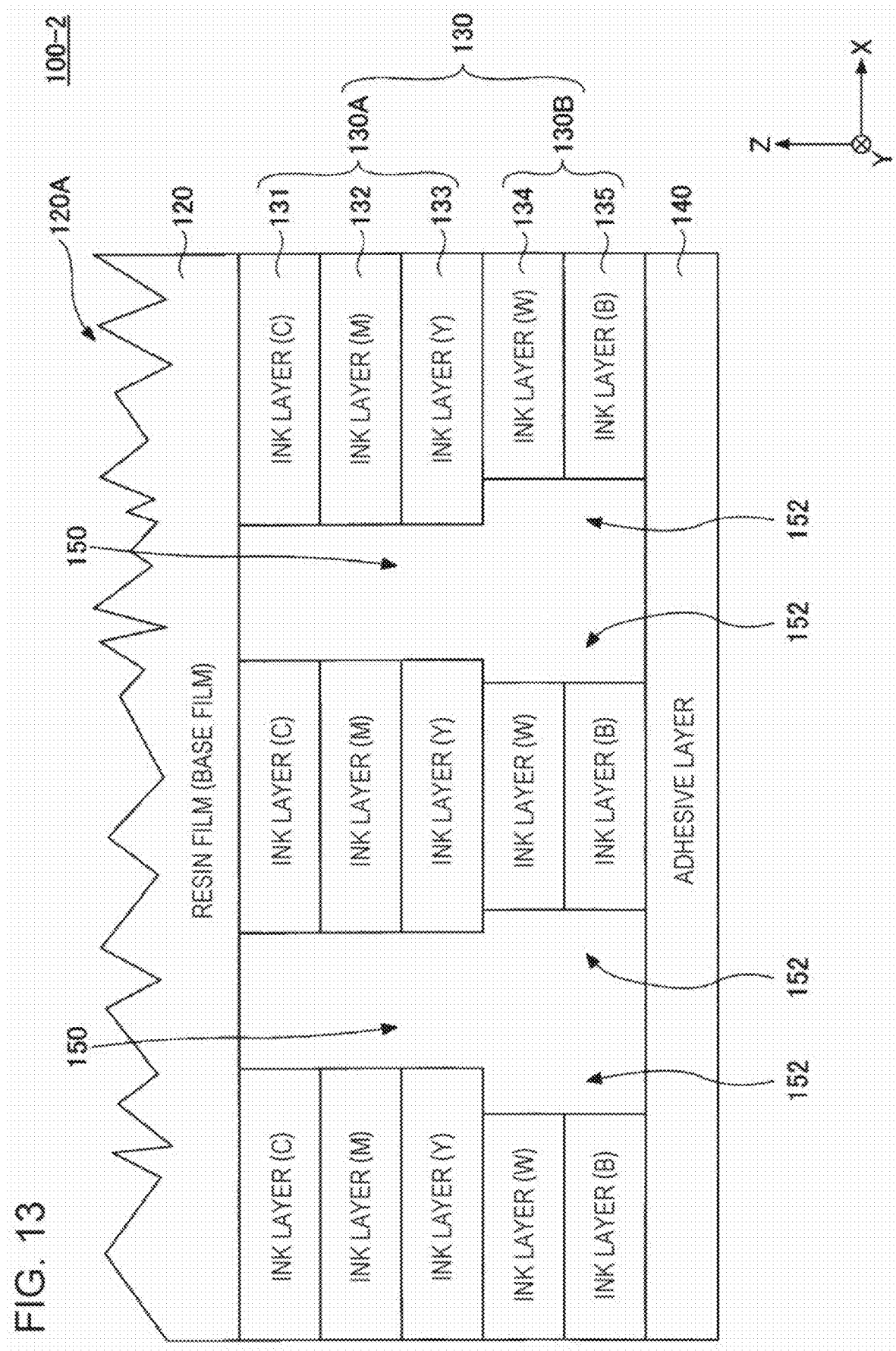
FIG. 13 is a diagram of a first comparative example of a decorating sheet according to one embodiment.

FIG. 13 is a diagram of a first comparative example of the decorating sheet 100 according to one embodiment. A decorating sheet 100-2 illustrated in FIG. 13 differs from the decorating sheet 100 illustrated in FIG. 3 in that it does not include the transparent sheet 110. As illustrated in FIG. 13, the decorating sheet 100-2 includes the colored layer 130 formed on the back surface of the resin film 120 through thermal transfer printing using a thermal transfer printer. Specifically, in the decorating sheet 100-2, the resin film 120 serves as "a base film".

Compared to the decorating sheet 100 illustrated in FIG. 3, the decorating sheet 100-2 according to the first comparative example not including the transparent sheet 110 can reduce the cost, and increase the transmittance of the decorating sheet 100-2 to allow the screen to be viewed therethrough. Thus, the decorating sheet 100-2 according to the first comparative example allows the screen displayed on the liquid crystal display 12 to be more clearly visually identified from the surface of the decorating sheet 100-2.

Second Comparative Example of Decorating Sheet 100

FIG. 14 illustrates a second comparative example of the decorating sheet 100 according to one embodiment. A decorating sheet 100-3 illustrated in FIG. 14 differs from the decorating sheet 100-2 illustrated in FIG. 13 in that it further includes a buffer layer 160 between the colored layer 130 and the adhesive layer 140.

The buffer layer 160 absorbs a shock caused by a contact of a contactor against the surface of the decorating sheet 100-3. A transparent sheet-shaped buffering material (such as thermoplastic polyurethane elastomer) is used for the buffer layer 160.

In the decorating sheet 100-3 according to the second comparative example, the buffer layer 160 provides elasticity corresponding to the cloth pattern formed by the decorating sheet 100-3 to the decorating sheet 100-3. Thus, the decorating sheet 100-3 can provide a texture much closer to that of the surface of a real cloth material to the contactor that comes into contact with the surface of the decorating sheet 100-3.

Third Comparative Example of Decorating Sheet 100

FIG. 15 illustrates a third comparative example of the decorating sheet 100 according to one embodiment. A decorating sheet 100-4 illustrated in FIG. 15 differs from the decorating sheet 100-3 illustrated in FIG. 14 in that it includes a resin panel 170 attached to the adhesive layer 140, and an elastic detection electrode 180 disposed on the back surface of the resin panel 170.

The decorating sheet 100-4 according to the third comparative example including the resin panel 170 and the elastic detection electrode 180 is usable as a touch screen having a cloth pattern on the surface. For example, the decorating sheet 100-4 can detect an approach of a contactor to the surface. For example, the decorating sheet 100-4 can receive an input from the contactor. For example, the decorating sheet 100-4 can specify the contact position of the contactor, and receive an input corresponding to the contact position.

Although some embodiments of the present invention have been described in detail, the present invention is not limited to these embodiments, and may be modified or changed in various manners within the scope of the gist of the present invention described in the scope of claims.

For example, a decorating sheet described in the embodiments are usable for decorating, for example, vehicle interior components. Instead, a decorating sheet described in the embodiments is usable for any decoration target component. A decorating sheet described in the embodiments is applicable to, besides a decoration target component (for example, a liquid crystal display) not including an electrostatic sensor, a decoration target component (for example, a touch screen or a liquid crystal display) including an electrostatic sensor.

A decorating sheet described in the embodiments may be modified to represent, for example, a material pattern formed from a decoration pattern (for example, a wood-grain pattern or a metallic pattern) other than a cloth pattern using a colored layer, and to provide a texture corresponding to another decoration pattern using an uneven portion (or not to provide a texture without including an uneven portion). The uneven portion that provides a texture does not necessarily have to match the material pattern. Specifically, an operator identifies the material pattern with the visual sensation. Thus, regardless of when the texture provided by the surface of the decorating sheet to the operator differs from the texture of a real material, the decorating sheet can evoke a sensation of touching a real material in an operator. When the decorating sheet does not provide the texture without including the uneven portion, a thin plate-shaped transparent material (for example, a glass plate or a transparent resin plate) may be used as the base member of the material decorating sheet instead of a sheet-shaped transparent base film.

For example, instead of a decoration target component including a liquid crystal display, the decorating sheet described in the embodiments is usable for the decoration target component including another display device (for example, a LED display device or an organic electroluminescence (EL) display).

What is claimed is:

1. A decorating sheet configured to form a material pattern on a surface of a decoration target component, the decorating sheet comprising:
    a base film that is sheet-shaped and has a transparent property, the base film having top and bottom surfaces outwardly opposite to each other;
    a resin film having a bottom surface disposed on the top surface of the base film, the resin film having a top surface having an uneven portion, the uneven portion having a texture as part of the material pattern; and
    a colored layer having a top disposed on the bottom surface of the base film and forming another part of the material pattern with a plurality of inks, the colored layer having a bottom configured to face the decoration target component, the plurality of inks being stacked along a first direction, the first direction extending along a distance between the top and the bottom of the colored layer,
    wherein the colored layer is configured with a striped pattern having a plurality of lines in a plan view, and every two adjacent lines of the plurality of lines are spaced apart from each other and sandwich an ink-free area that has no ink therein,
    each of the plurality of lines corresponds to the stacked plurality of inks, and including a first ink and a second ink,
    the plurality of lines obliquely extend with respect to a first side of the base film in the plan view, the first side extends along a second direction in the plan view, and the second direction is perpendicular to the first direction,
    a width along the second direction of the first ink is larger than a width along the second direction of the second ink such that both edge parts along the second direction of the first ink extend from both edges along the second direction of the second ink in the plan view, respectively,
    the first ink completely overlaps with the second ink except for the both edge parts of the first ink in the plan view,
    an overlapped area of the first and second inks forms a light-shielding area that blocks light from a back surface of the decorating sheet, and
    the both edge parts of the first ink forms the another part of the material pattern.

2. The decorating sheet according to claim 1, wherein the first ink is stacked on the second ink.

3. The decorating sheet according to claim 1, further comprising:
    an adhesive layer disposed on the bottom of the colored layer,
    wherein the adhesive layer is configured to attach a stacked structure of the resin film, the base film, and the colored layer to the decoration target component.

4. The decorating sheet according to claim 1, wherein an elastomer resin is used for the resin film.

5. The decorating sheet according to claim 2, wherein an elastomer resin is used for the resin film.

6. The decorating sheet according to claim 4, wherein the plurality of inks of the colored layer include one or more thermal transfer inks.

7. The decorating sheet according to claim 5, wherein the plurality of inks of the colored layer include one or more thermal transfer inks.

8. The decorating sheet according to claim 6, wherein the colored layer is directly printed through thermal transfer on the bottom surface of the base film.

9. The decorating sheet according to claim 7, wherein the colored layer is directly printed through thermal transfer on the bottom surface of the base film.

10. A decorating sheet configured to form a decoration pattern on a surface of a decoration target component, the decorating sheet comprising:
- a base member that is plate-shaped and has a transparent property, the base member having top and bottom surfaces outwardly opposite to each other; and
- a colored layer having a bottom configured to face the decoration target component, the colored layer having a top disposed on the bottom surface of the base member and forming the decoration pattern with a plurality of inks, the plurality of inks being stacked along a first direction, the first direction extending along a distance between the top and the bottom of the colored layer,
- wherein the colored layer is configured with a striped pattern having a plurality of lines in a plan view, and every two adjacent lines of the plurality of lines are spaced apart from each other and sandwich an ink-free area that has no ink therein,
- each of the plurality of lines corresponds to the stacked plurality of inks including a first ink and a second ink,
- the plurality of lines obliquely extend with respect to all sides of the base member in the plan view, a first side of the all sides extends along a second direction in the plan view, and the second direction is perpendicular to the first direction,
- a width along the second direction of the first ink is larger than a width along the second direction of the second ink such that both edge parts along the second direction of the first ink extend from both edges along the second direction of the second ink in the plan view, respectively,
- the first ink completely overlaps with the second ink except for the both edge parts of the first ink in the plan view,
- an overlapped area of the first and second inks forms a light-shielding area that blocks light from a back surface of the decorating sheet, and
- the both edge parts of the first ink forms part of the decoration pattern.

11. The decorating sheet according to claim 10, wherein the colored layer includes
- a decoration layer forming the decoration pattern, and
- a light-shielding layer that blocks light from the back surface of the decorating sheet.

12. The decorating sheet according to claim 11, wherein the plurality of inks of the decoration layer and the light-shielding layer each include a thermal transfer ink.

13. The decorating sheet according to claim 11,
wherein the colored layer has an uncolored pattern including a plurality of uncolored areas in the light-shielding layer, and the plurality of uncolored areas have a groove width larger than a groove width of the plurality of uncolored areas in the decoration layer, and
the plurality of uncolored areas are portions not colored with one of the plurality of inks, and the plurality of uncolored areas and the plurality of lines of the striped pattern are arranged side by side.

14. The decorating sheet according to claim 13,
wherein an inclination angle of each of the plurality of uncolored areas with respect to a vertical direction or a lateral direction of a display screen of a display device disposed on the back surface of the decorating sheet falls within a range of 45 degrees to 60 degrees.

15. A display unit, comprising:
a decorating sheet configured to form a material pattern on a surface of a decoration target component, the decorating sheet including:
- a base film that is sheet-shaped and has a transparent property, the base film having top and bottom surfaces outwardly opposite to each other;
- a resin film having a bottom surface disposed on the top surface of the base film, the resin film having a top surface having an uneven portion, the uneven portion having a texture as part of the material pattern; and
- a colored layer having a top disposed on the bottom surface of the base film and forming another part of the material pattern with a plurality of inks, the colored layer having a bottom configured to face the decoration target component, the plurality of inks being stacked along a first direction, the first direction extending along a distance between the top and the bottom of the colored layer; and
a display screen, as the decoration target component, disposed on a back surface of the decorating sheet,
wherein the colored layer is configured with a striped pattern having a plurality of lines in a plan view, and every two adjacent lines of the plurality of lines are spaced apart from each other,
each of the plurality of lines corresponds to the stacked plurality of inks, and
the plurality of lines obliquely extend with respect to any one of sides of the base film in the plan view.

16. A display unit, comprising:
a decorating sheet configured to form a decoration pattern on a surface of a decoration target component, the decorating sheet including:
- a base member that is plate-shaped and has a transparent property, the base member having top and bottom surfaces outwardly opposite to each other; and
- a colored layer having a bottom configured to face the decoration target component, the colored layer having a top disposed on the bottom surface of the base member and forming the decoration pattern with a plurality of inks, the plurality of inks being stacked along a first direction, the first direction extending along a distance between the top and the bottom of the colored layer; and
a display screen, as the decoration target component, disposed on a back surface of the decorating sheet,
wherein the colored layer is configured with a striped pattern having a plurality of lines in a plan view, and every two adjacent lines of the plurality of lines are spaced apart from each other, each of the plurality of lines corresponds to the stacked plurality of inks, and the plurality of lines obliquely extend with respect to all sides of the base member in the plan view.

* * * * *